May 19, 1953 G. P. ROTHWELL 2,638,662
WORK HOLDING AND ADVANCING DEVICE
Filed March 2, 1950 9 Sheets-Sheet 2
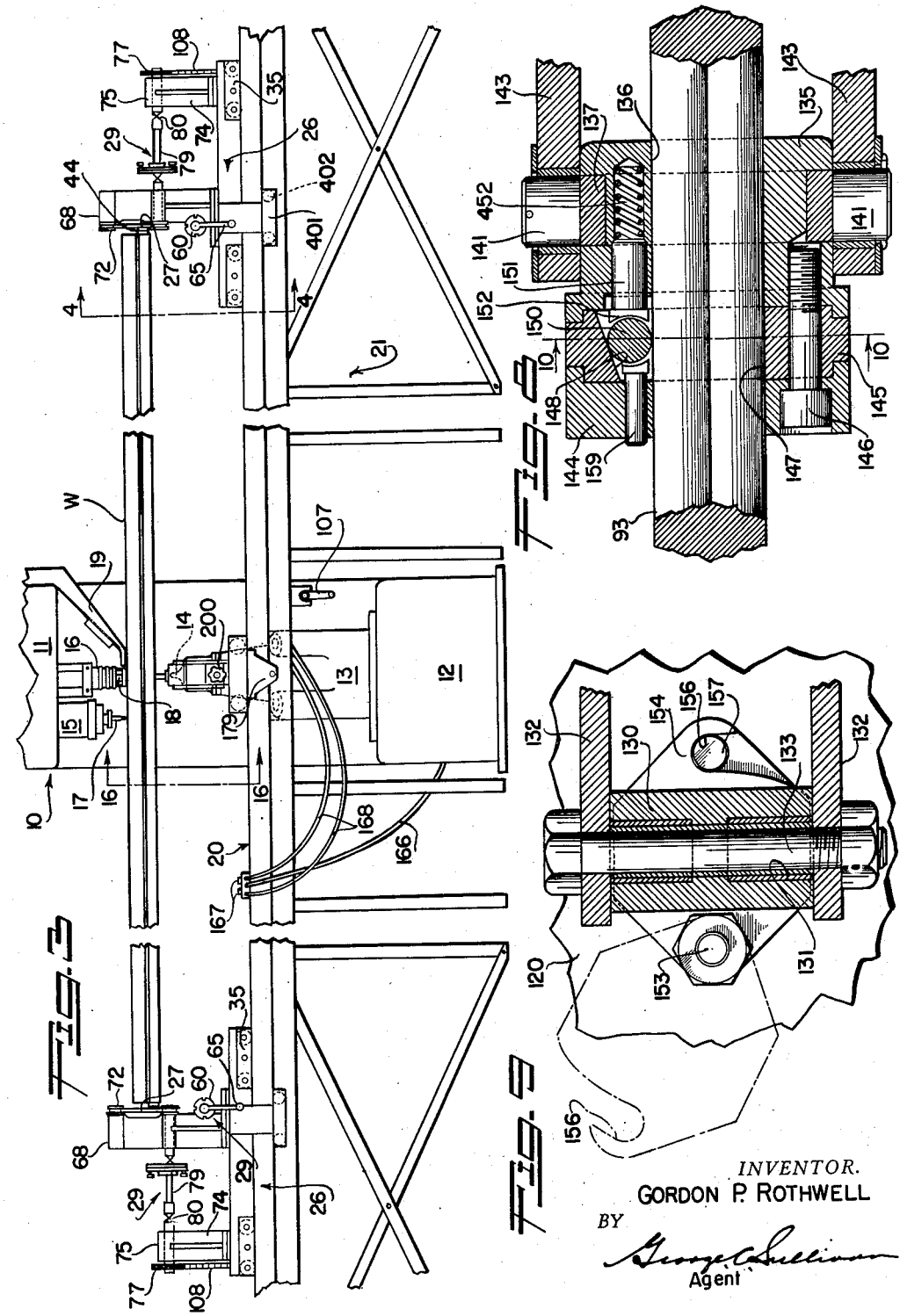
INVENTOR.
GORDON P. ROTHWELL
BY
George C. Sullivan
Agent May 19, 1953 G. P. ROTHWELL 2,638,662
WORK HOLDING AND ADVANCING DEVICE
Filed March 2, 1950 9 Sheets-Sheet 3
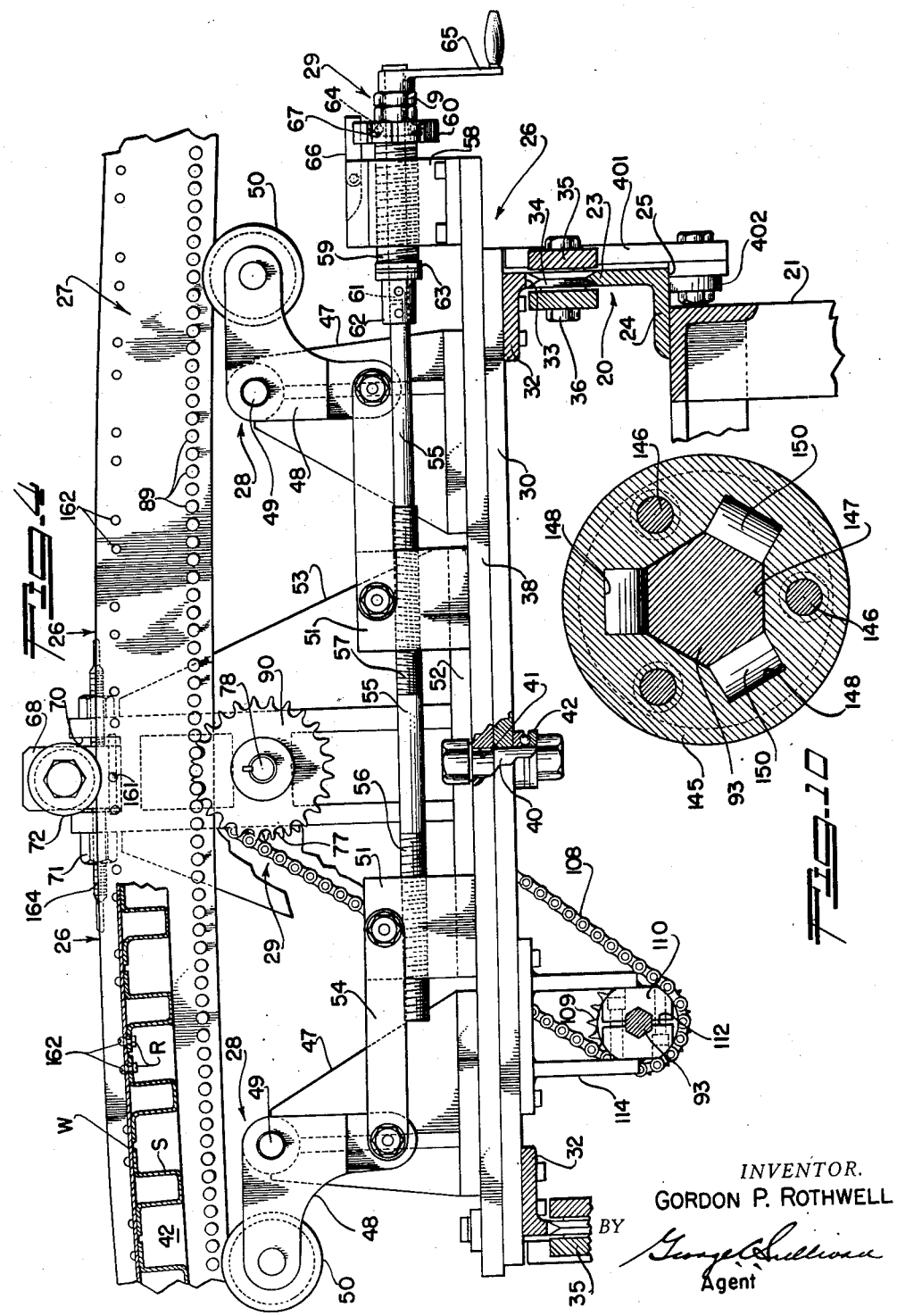
INVENTOR.
GORDON P. ROTHWELL
BY
*George C. Sullivan*
Agent

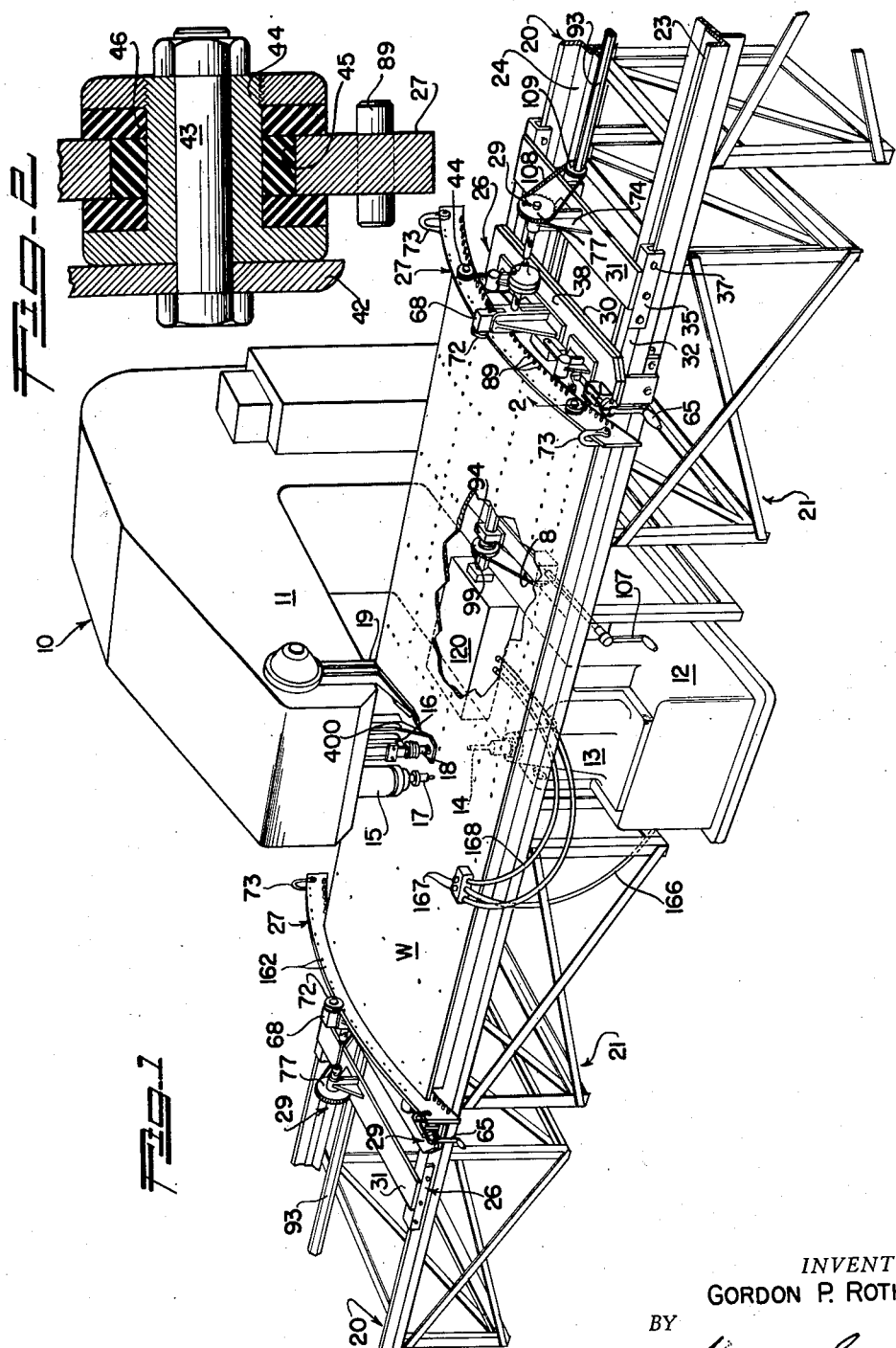

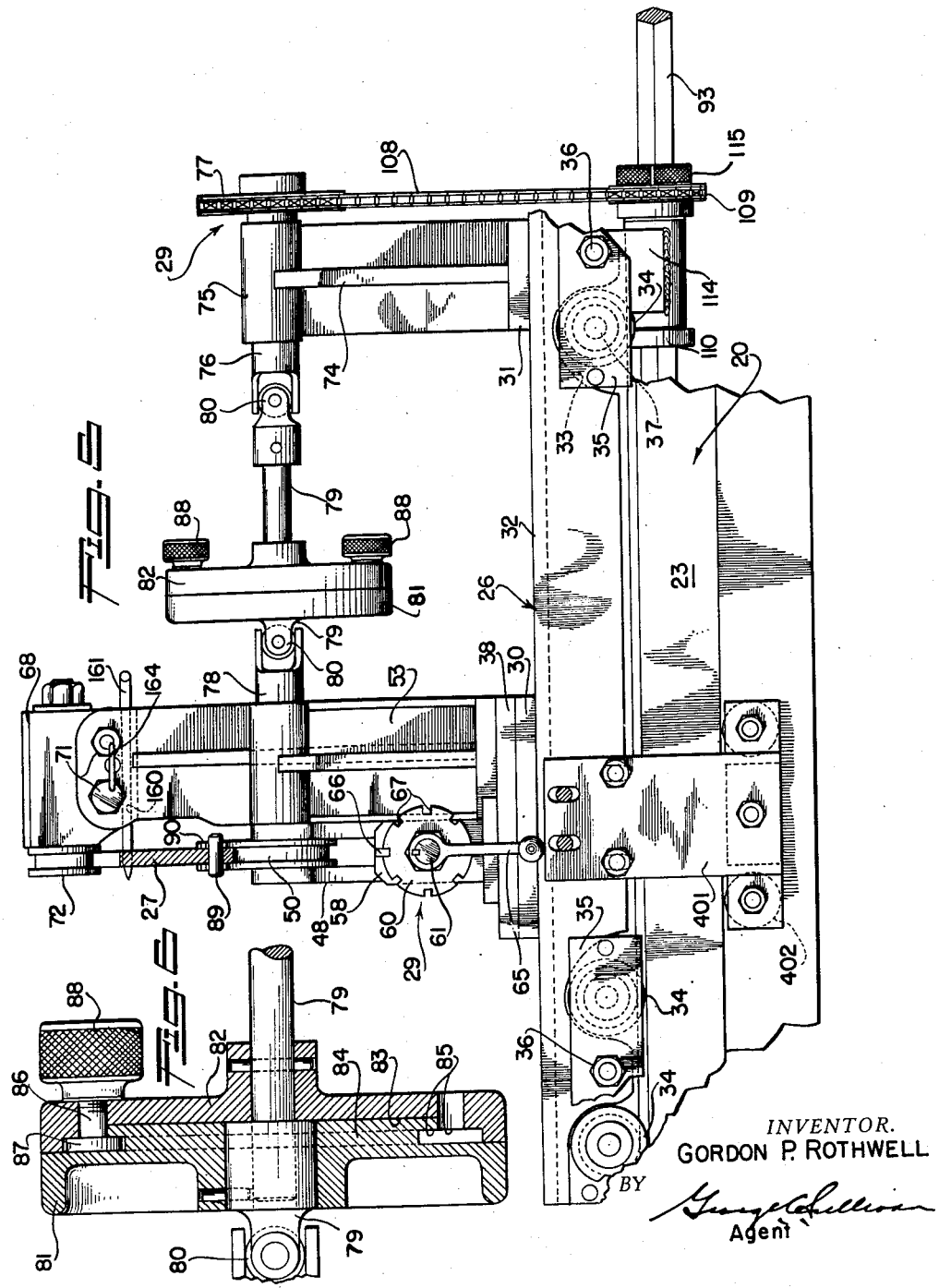

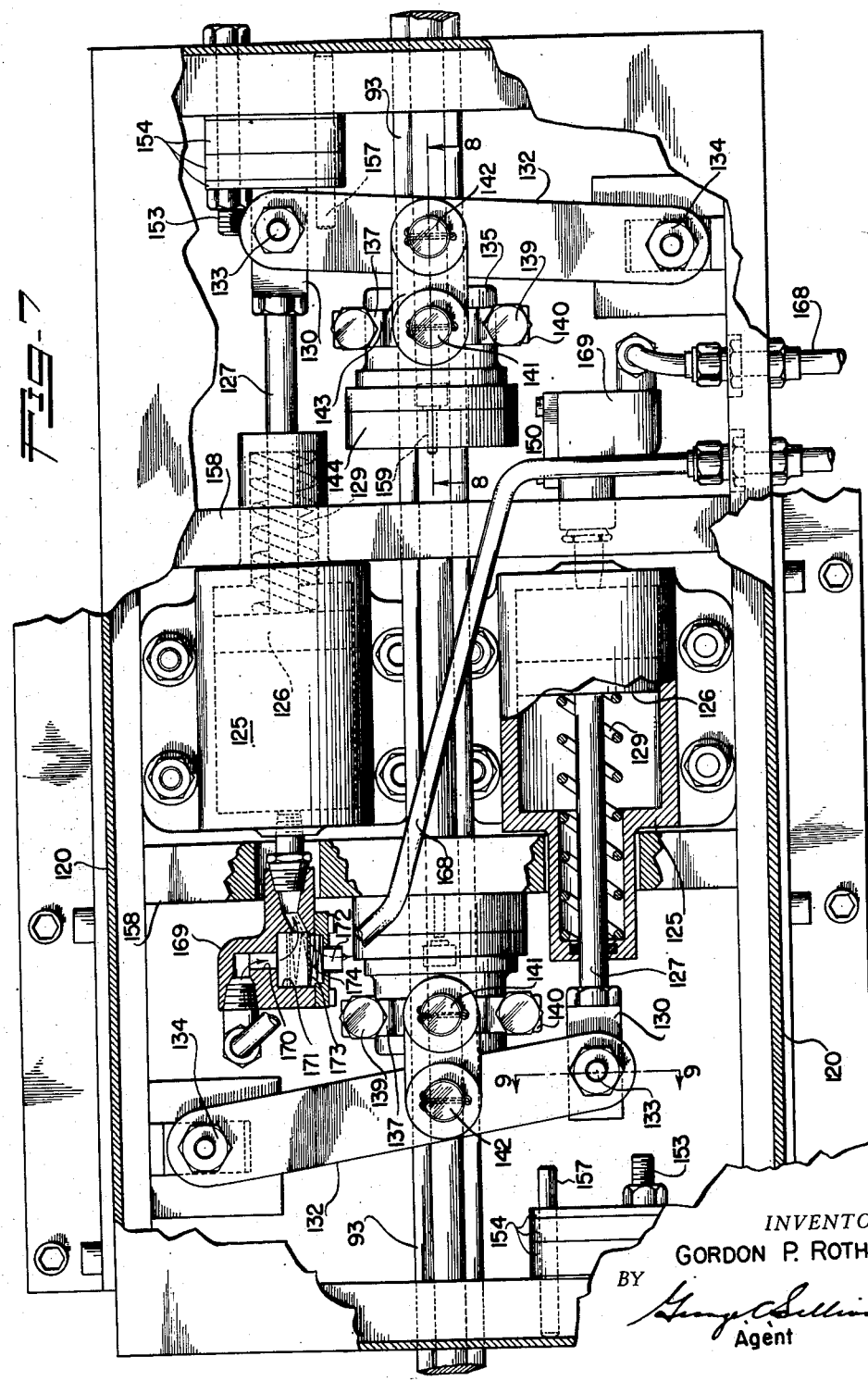

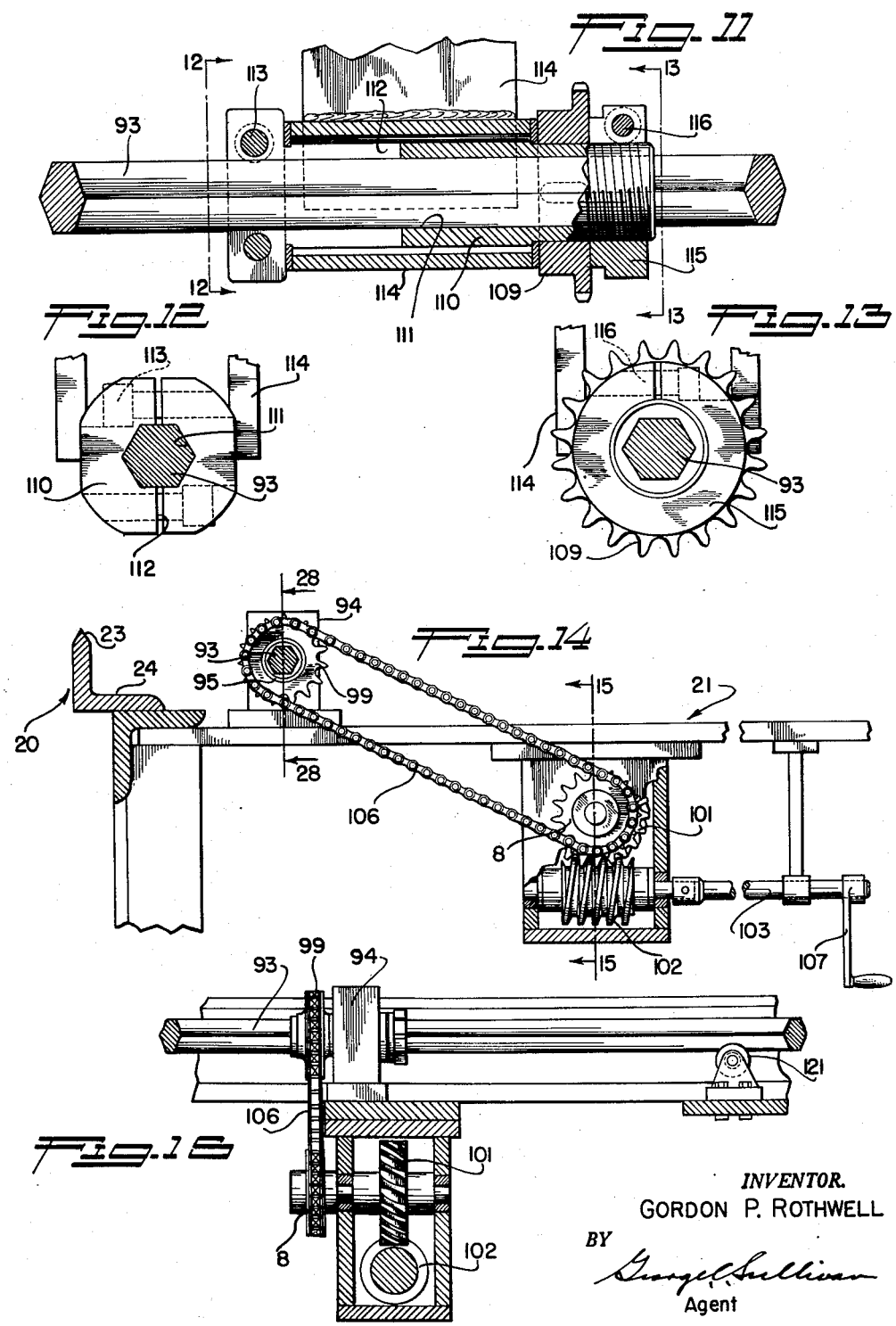

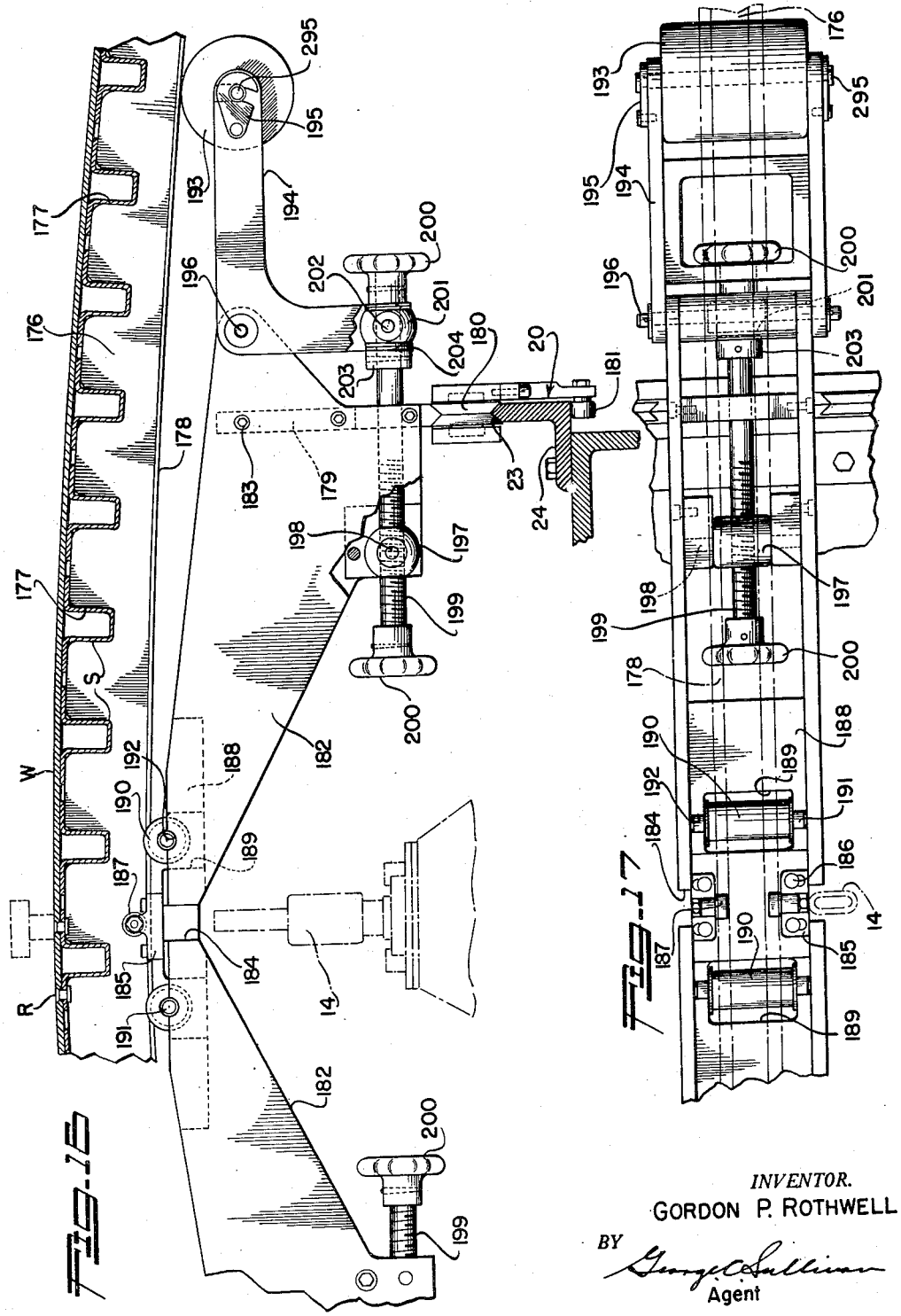

May 19, 1953 G. P. ROTHWELL 2,638,662
WORK HOLDING AND ADVANCING DEVICE
Filed March 2, 1950 9 Sheets-Sheet 8
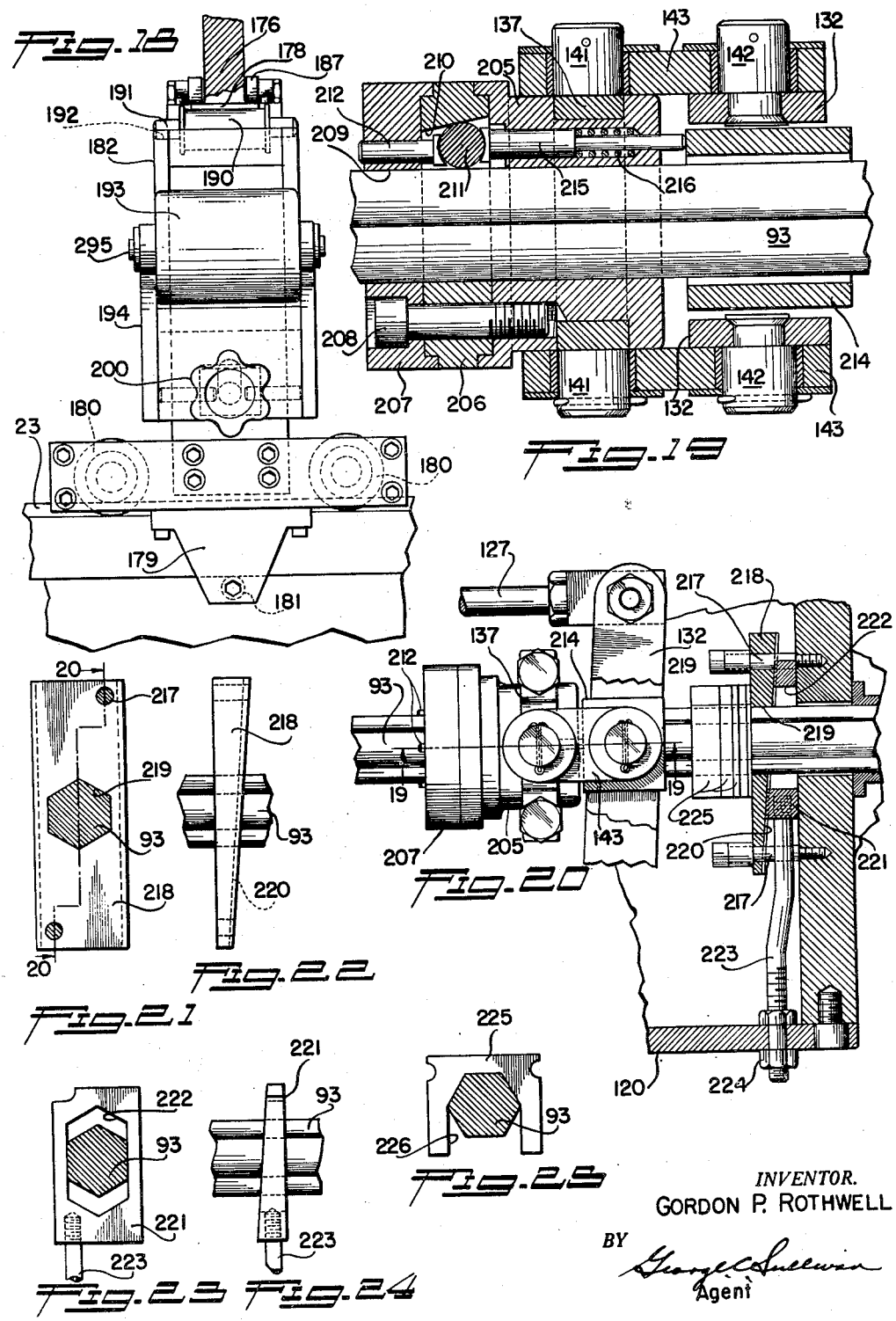
INVENTOR.
GORDON P. ROTHWELL
BY George C. Sullivan
Agent

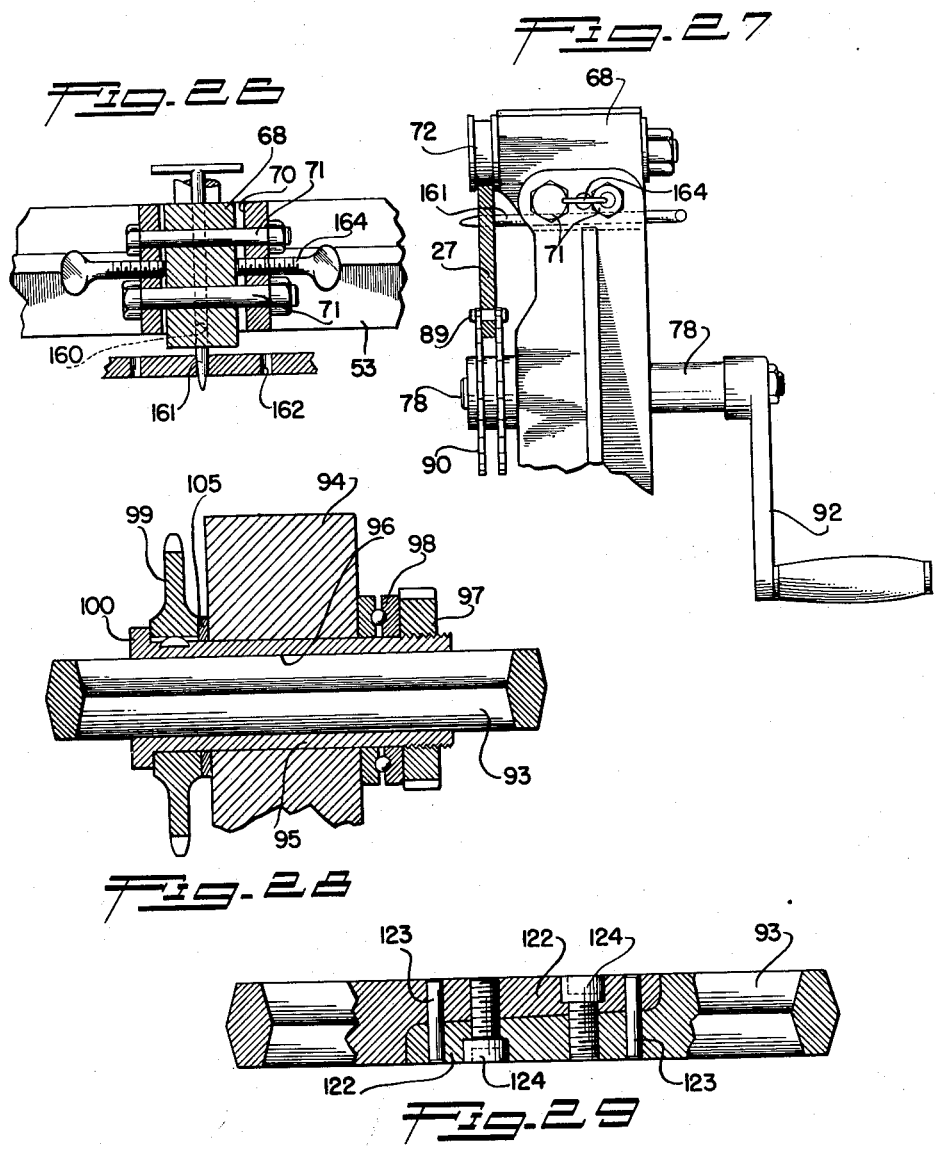

Patented May 19, 1953

2,638,662

UNITED STATES PATENT OFFICE 2,638,662

WORK HOLDING AND ADVANCING DEVICE

Gordon P. Rothwell, La Crescenta, Calif., assignor to Lockheed Aircraft Corporation, Burbank, Calif.

Application March 2, 1950, Serial No. 147,227

22 Claims. (Cl. 29—34)

This invention relates to devices for holding and advancing workpieces and relates more particularly to mechanisms for holding, advancing and indexing panels, assemblies, and parts of sheet metal and the like.

Various machines have been introduced for drilling or punching openings in parts and assemblies of sheet metal and other materials, countersinking or dimpling the openings, and then inserting and driving rivets in the openings. It has been the general practice in the past for the operator of such a machine to manually advance, index and hold the work for the successive operations of the machine. Where the work is in the nature of large panels or assemblies it is, of course, difficult if not practically impossible for the operator, even with the assistance of one or more helpers, to accurately and expeditiously carry on such operations. Although dollies have been employed to facilitate the manual handling of small and relatively small workpieces in such machines, there have been no practical work holding, indexing and advancing devices introduced for handling large, heavy panels or assemblies in the automatic drilling or punching, countersinking, and rivet driving machines.

It is, therefore, a general object of this invention to provide a practical and effective device or means for holding, advancing and indexing large, heavy panels, fabricated workpieces, and the like, in machines for drilling or punching holes in the workpiece, countersinking or dimpling the holes, and for then inserting and driving the rivets. The device of the invention is such that one operator may easily and quickly position the workpiece for an initial cycle of operation of the machine and then cause the rapid advancements of the workpiece to given or indexed positions for the successive cycles of operation of the machine, all with a minimum expenditure of effort on the part of the operator.

Another object of the invention is to provide a work handling device of this character in which the workpiece is successively or intermittently advanced by power means, for example by fluid pressure actuated means, and in a rapid positive manner. The longitudinal advancement of the workpiece is effected by simple, easy manipulation of a manual button, lever, or foot pedal which controls the advancing mechanism.

Another and important object of the invention is to provide a work handling device of the character mentioned incorporating a novel and particularly versatile work advancing means which may be conditioned to advance the workpiece in either longitudinal direction for any given or desired distance with each operation of a series of operations and to then advance the workpiece another and different distance with each operation of a succeeding series of advancements and so on. In accordance with the invention the longitudinal feed or advancing means may be set or conditioned to cause step-by-step advancement of the workpiece from a selected position and through a given distance at each stage of advancement, following which the workpiece may be advanced to a new initial position and the device may then be conditioned to cause step-by-step advancement of the workpiece from this position and through any given distance at each advancement. As distinguished from lead screw feeds, worm feeds and rack feeds, wherein the initial and subsequent locating, setting or indexing of the workpiece is dependent to some extent at least upon the pitch of the threads or the spacing of the teeth, the feed means of the invention may locate or index the workpiece with great accuracy at any selected position and then successively and accurately advance the workpiece through selected increments of movement which are entirely independent of the shapes of the mechanical elements of the feed mechanism.

Another object of the invention is to provide a work handling device of the character mentioned which serves to hold the workpiece in a plane normal to the drilling or punching spindle and the riveting spindle of the machine to assure the formation of vertical openings in the workpiece and the correct flush or smooth driving of the rivets. The device includes contour bars which may be shaped to conform with the contour of the workpieces and these bars are settable or adjustable to preserve the correct normal relationship between the workpiece and the machine spindles during the driving of any given row of rivets. The machine also incorporates intermediate work supporting means adjustable to conform with the workpiece and adapted to prevent tipping, bowing, or sagging of large contoured workpieces.

Another object of the invention is to provide a work handling device of this character operable to feed the workpiece transversely for the driving of spaced longitudinal rows of rivets, the device embodying a positive but readily adjustable transverse feed means.

A further object of the invention is to provide a work handling device wherein the transverse feed means may be manipulated to provide for the driving of spaced parallel rows of rivets or for the driving of convergent or divergent rows of rivets such as often employed in tapered workpieces or panels. The two end carriages of the work holding device are capable of either simultaneous transverse advancement through uniform distances or steps for the driving of straight parallel rows of rivets and may be operated either simultaneously or individually through unequal steps or distances to provide for the driving of divergent or convergent rows of rivets, the end carriages being capable of limited angular or pivotal movement about vertical axes to permit such unequal transverse feeding of the workpiece.

A still further object of the invention is to provide a device of the character referred to in which the supporting track structure and associated elements of the feed mechanism may be extended or reduced in length to adapt the mechanism for the handling of workpieces of various lengths by the addition or detachment of sections of the track structure and feed mechanism.

Other objectives and features of the invention will be better understood from the following detailed description of typical preferred embodiments, throughout which description reference will be had to the accompanying drawings, wherein:

Figure 1 is a front perspective view of the work handling device of the invention associated with an automatic drilling, countersinking and riveting machine illustrating a work panel on the device in position to be riveted;

Figure 2 is an enlarged fragmentary vertical sectional view of one of the yieldable connections between a contour bar and the workpiece;

Figure 3 is a front elevation of the machine and work handling device with certain portions broken away;

Figure 4 is an enlarged vertical sectional view taken substantially as indicated by line 4—4 on Figure 3 with the end parts of the workpiece and contour bar and other portions broken away;

Figure 5 is an enlarged fragmentary front elevation of the transverse feed means at one end of the panel or workpiece with certain parts appearing in vertical cross section;

Figure 6 is an enlarged vertical detailed sectional view of the releasable clutch or coupling for permitting individual adjustment of one unit of the transverse feed means;

Figure 7 is an enlarged horizontal detailed sectional view of the cylinder and piston actuating means and clutches of the longitudinal feed mechanism with the major parts appearing in plan elevation;

Figure 8 is an enlarged vertical detailed sectional view of one of the clutches of the longitudinal feed means, being a view taken as indicated by line 8—8 on Figure 7;

Figure 9 is an enlarged fragmentary vertical detailed sectional view taken substantially as indicated by line 9—9 on Figure 7, the broken lines indicating an inoperative position of one of the stop leaves;

Figure 10 is a transverse detailed sectional view taken as indicated by line 10—10 on Figure 8;

Figure 11 is a longitudinal sectional view illustrating the connection of one of the sprockets of the transverse feed mechanism with the longitudinally extending feed rod;

Figure 12 is a view taken substantially as indicated by line 12—12 on Figure 11;

Figure 13 is a view taken as indicated by line 13—13 on Figure 11;

Figure 14 is a fragmentary vertical sectional view illustrating the means for rotating the longitudinally extending feed rod;

Figure 15 is a fragmentary vertical sectional view taken substantially as indicated by line 15—15 on Figure 14;

Figure 16 is a fragmentary, vertical sectional view taken as indicated by lines 16—16 on Figure 3 illustrating an intermediate work supporting means;

Figure 17 is a fragmentary plan view of the intermediate work supporting means;

Figure 18 is a front elevation of the intermediate work supporting means with the false rib appearing in broken lines;

Figure 19 is an enlarged longitudinal sectional view similar to Figure 8 illustrating another form of clutch mechanism of the invention, being a view taken substantially as indicated by line 19—19 on Figure 20;

Figure 20 is a fragmentary plan view of the clutch mechanism of Figure 19 with a portion of the case and stop means appearing in horizontal cross section, being a view taken substantially as indicated by line 20—20 on Figure 21;

Figure 21 is a face or end elevation of the stop means of the clutch mechanism illustrated in Figure 20 with the feed rod appearing in vertical cross section;

Figure 22 is an edge elevation of the stop plate shown in Figure 21;

Figure 23 is a face or side view of the adjustable stop plate or wedge of the clutch mechanism with the feed rod appearing in vertical cross section;

Figure 24 is an edge elevation of the stop plate or wedge;

Figure 25 is a side elevation of one of the removable stop plates on the feed rod with the latter appearing in vertical cross section;

Figure 26 is a fragmentary horizontal sectional view of the adjustable work aligning and setting means taken as indicated by line 26—26 on Figure 4;

Figure 27 is a fragmentary side elevation of one form of the transverse feed operating means with a portion of the mechanism appearing in vertical cross section;

Figure 28 is an enlarged vertical sectional view taken substantially as indicated by line 28—28 on Figure 14; and Figure 29 is a fragmentary sectional view illustrating a joint in the sectional axial feed rod.

The work handling device of the invention may of course be varied considerably in design, proportions, etc. to adapt it for use with automatic or power-driven hole forming and rivet driving mechanisms of different types, makes and sizes. Accordingly, the invention is not to be construed as limited or restricted to the particular embodiment or application illustrated in the accompanying drawings. The opening forming and rivet driving machine illustrated has a frame or body 10 in the form of a large yoke, provided with upper and lower horizontally projecting arms 11 and 12. An upstanding pedestal or post 13 on the lower arm 12 carries an anvil 14. The work W to be riveted, is adapted to be inserted between the yoke arms 11 and 12 and the anvil 14 is therefore at the under side of the work. The upper arm 11 of the machine has a clamping foot 400 which serves to vertically locate the work, and also incorporates a depth control stop for the drilling and countersinking spindles or heads 15 and 16. The heads 15 and 16 project from the under side of the arm 11, the head 15 carrying a drilling and countersinking spindle 17 and the head 16 being provided with a rivet driving shoe or spindle 18. A rivet feeding mechanism 19 is provided on the arm 11 and is cooperable with the spindle 18 to deliver rivets thereto when the spindle is brought to a given position. The heads 15 and 16 are interconnected and are operated or moved between positions where their respective spindles 17 and 18 are vertically aligned with the anvil 14 for the respective drilling and counterboring of the opening of the work W and the insertion and driving of a rivet in the opening thus provided. The spindle 18 is in the rivet receiving position at the feed means 19 when the spindle 17 is in its drilling and countersinking position. It is to be understood that the automatic machine not only operates the heads 15 and 16 between the positions mentioned above but also drives or rotates the drill and countersink of the spindle 17, feeds the spindle 17 vertically, actuates the rivet inserting and driving head and spindle 18 and retracts and advances the anvil 14 vertically, all of these operations being rapidly performed in an automatic series of sequence. Furthermore, the machine may be manually controlled to effect independent retraction and/or vertical advancement of the anvil 14 and independent action of the other elements as required. However, the present invention is not primarily concerned with the details of the riveting machine or its mode of operation and these features are, therefore, omitted from the present description.

The work handling and advancing means of the invention may be proportioned to support workpieces and assemblies of various sizes and shapes, and it is a feature that the means or device may be designed to carry large, heavy panels and assemblies. The invention includes a pair of spaced parallel horizontal tracks 20 which pass between the yoke arms 11 and 12 in a direction perpendicular to the long axes of the arms. In practice, the tracks 20 may be quite long and may be supported by any available or appropriate structure at the place of installation of the riveting machine. In the case illustrated in the drawings, the tracks 20 are supported on appropriately braced trestles 21, which in turn are fixed to the floor. The trestles 21 may be individual structures and each track 20 may be made up of accurately aligned sections so that the length of the track assembly may be extended or shortened at will in accordance with the demands of the work to be handled. As best illustrated in Figures 1 and 4, each track 20 includes one or more lengths of angle stock arranged to have a vertical flange whose upper edge 23 is beveled from each side to constitute what may be termed a knife-edge. The lower or horizontal flanges 24 of the tracks 20 are bolted or otherwise attached to the trestles 21 to project horizontally therefrom and thus present downwardly facing horizontal surfaces 25.

The apparatus or device of the invention further includes two assemblies or carriages 26 for arrangement at the opposite ends of the work W and supported by the tracks 20 for movement therealong. These carriages 26 carry the contour bars 27 which are attached to the ends of the workpiece W; means 28 for supporting the bars 27 and the workpiece; and the means 29 for feeding the workpiece transversely. The specific construction of the carriages 26 is not of prime importance and may be varied, at least to some extent, as desired. In the embodiment of the invention illustrated, each carriage 26 includes an inner plate 30 and an outer plate 31, the plates extending transversely of the tracks 20. The ends of the plates 30 and 31 rest upon and are secured to angle members 32 which extend above and parallel with the tracks 20. The lower or vertical flanges of the angle members 32 are cut out or recessed at 33 to freely receive rollers 34 which ride on the tracks 20. Side plates 35 are secured to the members 32 at the recesses 33 by bolts 36, or the equivalent, and the axles or trunnions 37 of the rollers 34 are rotatably carried by these plates. The peripheries of the rollers 34 are grooved to conform with and receive the knife edges 23 of the supporting tracks 20. The rollers 34 are provided in pairs of sets and there is preferably a set of rollers adjacent each end of each carriage member 32. Brackets or plates 401 of the carriages 26 carry rollers 402 for cooperating with the lower track faces 25.

Each carriage 26 further includes an upper plate 38 overlying and resting upon the abovementioned inner plate 30, see Figures 4 and 5. For the purpose to be subsequently described, the upper plates 38 are supported on their respective plates 30 for limited pivotal movement about vertical axes. As best shown in Figure 4, a vertical pivot pin 40 is arranged through vertical openings 41 in the plates 30 and 38 of each carriage, substantially midway between the spaced tracks 20. The opposite ends of the pins 40 have heads and anti-friction bearings 42 are arranged between the lower heads and the undersides of the plates 30 to assume the vertical loads that may result from any tendency for the plates 38 to tilt or tip.

The abovementioned contour bars 27 are connected with or secured to the ends of the workpiece W and are mounted on the carriages 26 through the medium of the support means 28 and transverse feed means 29. There is preferably a single bar 27 at each end of the workpiece W and the bars are longitudinally curved to conform generally to the contour of the workpiece, it being apparent that where the workpiece is flat the bars may be straight. The bars 27 may be simple, flat-sided members provided with curved upper and lower edges conforming with the contour of the workpiece W, as illustrated in Figures 1 and 4. The attachments or connections between the workpiece W and the bars 27 may comprise angle strips secured to or forming portions of the ends of the workpiece and having down-turned flanges 42. Horizontal bolts 43 pass through openings in the flanges 42 and each bolt carries a spool 44, as shown in detail in Figure 2. The spools 44 extend through openings 45 in the contour bars 27 with considerable clearance although the end flanges of the spools which are spaced from the sides of the contour bars are larger in diameter than the openings 45. Pads or liners 46 of rubber, rubber composition or other yielding resilient material are provided on the spools 44 to cooperate with the openings 45 and the opposite sides of the contour bars 27 to provide somewhat yielding connections between the bars 27 and the workpiece W to absorb shock and to permit ready alignment of the work and the contour bars.

The means 28 for assisting in supporting the workpiece W on the carriages 26 and for tilting or rocking the workpiece includes two units or assemblies, one for each of the carriages 26, and these two assemblies may be identical. Each unit or assembly of the means 28 includes two spaced posts or standards 47 fixed to the respective carriage plate 38, see Figure 4. A bell crank 48 is pivoted on each standard 47 at 49 and each bell crank carries a rotatable roller 50. The rollers 50 are grooved to receive the lower edges of the contour bars 27 and are positioned to support the bars at points substantially aligned with or above the spaced tracks 20. Blocks 51 are slidably mounted on the plates 38 and are guided for transverse movement by engaging the edges of the bases 52 of central standards 53 mounted on the plates 38. The links 54 are pivotally connected with the lower arms of the bell cranks 48 and have their innner ends pivotally connected with the blocks 51 so that movement of the blocks causes vertical movement or swinging of the related rollers 50.

The work supporting means and work tilting means 28 further include horizontal screw shafts 55 having threaded cooperation with the slidable blocks 51. There is a screw shaft 55 arranged transversely of the tracks 20 at the upper side of each carriage 26 and threaded through openings in the two spaced blocks 51 on the carriage. The threads 56 of one block 51 and the shaft 55 are right hand threads while the threads 57 of the other block 51 and the screw shaft are left hand so that rotation of the shaft in one direction causes the blocks 51 to move toward one another and rotation of the shaft in the other direction causes the blocks to move away from one another. It will be seen that rotation of the shaft 55 in one direction simultaneously elevates the two related rollers 50 while rotation of the shaft in the other direction simultaneously lowers the rollers 50.

Each screw shaft 55 is provided at its forward end with a mechanism whereby the operator may either rotate the shaft to produce the roller raising and lowering action just described, or translate the shaft without rotation to produce tipping or tilting of the contour bar 27. Each of these mechanisms includes a boss or block 58 mounted on the carriage plate 38 to be in alignment with the related screw shaft 55. A tubular sleeve or bushing 59 is screw threaded through the block 58 and has a knob 60 on its forward end. A shaft section 61 extends through the bushing 59 with freedom so that these parts are related for relative rotation. The inner end of the shaft section 61 is connected with the related screw shaft 55 by a collar and pin connection 62 and a thrust bearing 63 is arranged between the inner end of the bushing 59 and the collar section 62. Jam nuts 9 are provided on the shaft section 61 in front of the bushing 59 and a thrust bearing 64 is arranged between the nuts and the forward end of the bushing. In practice, the thrust bearing 64 may be recessed in the knob 60. A hand crank 65 is fixed on the forward end of the shaft section 61 to facilitate rotation of the screw shaft 55. The knob 60 of the bushing 59 has circumferentially spaced notches 67 and a lock lever 66 is pivoted on the block 58 to be movable between a released position and a position where it may cooperate with any one of the notches 67 to hold the bushing 59 against rotation. With the lever 66 in cooperation with a notch 67 the crank 65 may be operated to rotate the screw shaft 55 to either simultaneously raise or lower the two rollers 50. In practice it is desirable to operate the screw shaft 55 in a manner to bring the rollers 50 into contact with the lower edge of the contour bar 27 and to then back off the rollers 50 slightly so that the contour bar and the workpiece may be easily adjusted or fed transversely by the feed means 29, to be described below.

To tilt or level the related contour bar 27 and/or the workpiece W the lock lever 66 is first raised to the released position and the knob 60 is then turned to shift or translate the shaft 55. This raises one roller 50 and lowers the other roller 50 and by this action at either one or both ends of the workpiece the portion of the workpiece at the anvil 14 may be leveled and the work holding device may be adjusted to properly handle workpieces that have a longitudinal twist or contour. It is to be understood that the leveling and tilting means 28 of the two carriages 26 may be identical or substantially the same and that the two means may be operated simultaneously or independently to level and tilt the workpiece W as required.

Each carriage 26 is preferably provided with means for preventing the workpiece W from tipping when its center of gravity moves beyond the tracks 20 and for limiting transverse advancement or feeding of the workpiece to prevent it from becoming displaced from the table. This means of each carriage 26 includes a block 68 freely received in a notch 70 in the upper end of the abovementioned standard 53. The block 68 is supported in the notch 70 by two horizontally spaced bolts or pins 71, see Figure 26. A roller 72 is rotatably supported at the inner face of the block 68 and is grooved to receive or cooperate with the upper edge of the related contour bar 27. The opposite ends of the contour bar 27 carry clevises 73 for facilitating hoisting and handling of the bar and workpiece W. These clevises 73 are engageable with the roller 72 to limit the transverse feed of the bar 27 and the workpiece. It will be seen that the rollers 72 cooperate with the bars 27 at points between the spaced rollers 50 to prevent unintentional tipping or displacement of the workpiece W. Prior to installing the contour bars 27 in the machine or prior to arranging the workpiece W on the work handling device, the inner pins or bolts 71 are removed and the blocks 68 are swung outwardly to permit the free placement of the contour bars 27 at the rollers 50. Subsequent to the installation of the contour bars 27 and the workpiece W, the blocks 68 are swung back to their normal positions and the pin or bolt 71 is reinstalled to retain the blocks in their operative positions.

The abovementioned transverse feed means 29 is operable to feed or advance the workpiece W transversely of the tracks 20 and is such that the workpiece can be fed axially, by an axial feed means to be later described, to cause the riveting machine to install straight parallel rows of rivets, divergent rows of rivets, or rows which follow the direction or shape of the ribs of stiffeners S or other elements being attached to the main workpiece panel. As illustrated in the drawings, the transverse feed means may be designed for simultaneous transverse advancement of both ends of the workpiece and may be constructed so that each end of the workpiece may be individually adjusted or moved transversely. In the construction shown in Figures 1, 3, 4, 5 and 11 to 15 inclusive, the transverse feed means 29 is associated with the longitudinial feed mechanism to be later described, and includes an upstanding support 74 on the outer plate 31 of each carriage 26. These supports 74 are provided at their upper ends with tubular bosses or journals 75 rotatably carrying horizontal shafts 76. Sprockets 77 are fixed to the outer ends of the shafts 76 to be driven from an element of the longitudinal feed mechanism as will be later described. The previously described standards 53 of the carriage plates 38 have horizontal openings or journals rotatably supporting shafts 78 that are normally substantially aligned with the sprocket shafts 76. Shaft sections 79 are interposed between the aligned shafts 76 and 78 and are connected with their adjacent ends by universal joints 80 so as to permit limited pivotal movement of the plates 38 on the pins 40 as above described.

Means are interposed between the pairs of shaft sections 79 to normally positively connect the sections and which may be released or loosened to allow relative rotation of the shafts so that the transverse position of the workpiece W may be accurately adjusted. These means include opposing discs 81 and 82, pinned, keyed, or otherwise secured to the adjacent ends of the shaft sections 79. The discs 82 have depressions or recesses 83 receiving coaxial bosses 84 on the sections 81. The walls of the recesses 83 are stepped and the bosses 84 are flanged to present flat surfaces 85 lying in common transverse planes as best illustrated in Figure 6. Clamp screws 86 extend through diametrically opposite axial openings in the discs 82 and have heads 87 for cooperating with the companion surfaces 85. Knurled nuts 88 are threaded on the outer ends of the screws 86 to clamp against the outer end surfaces of the discs 82. Under normal operating conditions the nuts 88 are tightened down so that the heads 87 clamp against the surfaces 85 to positively connect the shaft sections 79. However, when it is desired to turn the shafts 78 without turning the sprockets 77, as when making a minor transverse adjustment or advancement of the workpiece W, the nuts 88 are backed off to permit relative angular movement between the discs 81 and 82.

The transverse feed means 29 further includes rows of spaced pins 89 extending along the lower edge portions of the contour bars 27. The pins 89 are equally spaced along the bars 27 and are secured in openings in the bars to project from their opposite side surfaces. The rows of pins 89 are curved to follow the curvature of the lower edges of the bars 27. Sprockets 90 are fixed to the inner ends of the above described shafts 78 and their peripheries are grooved to receive the lower edges of the contour bars 27 to support or assist in supporting the bars and the workpiece W on the carriages 26. The teeth of the sprockets 90 cooperate with the pins 89 at both sides of the contour bars 27 so that rotation of the sprockets serves to move or feed the bars and the workpiece W transversely of the tracks 20. It will be seen that upon rotation of the sprockets 77 the feed sprockets 90 are turned to move or advance the workpiece W transversely and, as will be later described, the sprockets 77 may be simultaneously rotated through the medium of certain elements of the axial feed means to simultaneously move both ends of the workpiece in the transverse direction. In other applications or uses of the apparatus suitable hand cranks 92 may be employed to rotate the transverse feed sprockets 90 and the sprockets 77 as well as certain other elements of the transverse feed means may be omitted. This form of transverse feed actuating means is illustrated in Figure 27 of the drawings.

The abovementioned element of the axial feed mechanism that is utilized to rotate the two sprockets 77 and thus cause simultaneous transverse movement of the two ends of the workpiece W is in the nature of a polygonal rod 93 extending longitudinally of the work handling apparatus. In practice, the rod 93 may be hexagonal in transverse cross section and extends horizontally in adjacent parallel relation to the rear track 20. The rod 93 is supported in the assembly of trestles 21 for both rotational and axial movement. As illustrated in Figures 14, 15 and 28, one of the means for supporting the rod 93 includes a block 94 secured on one of the trestles 21 and having a horizontal bore rotatably receiving a bushing 95. The bushing 95 has a polygonal opening 96 slidably receiving the rod 93. A collar or nut 97 is provided on one end of the bushing 95 and a thrust washer or bearing 98 is engaged between the nut and a side of the block 94 to hold the bushing against axial movement in one direction. The bushing 95 extends from the other side of the supporting block 94 and a sprocket 99 is keyed or otherwise fixed to the projecting portion of the bushing. A flange 100 on the end of the bushing 95 cooperates with the outer end of the sprocket portion of the hub 99 and a thrust bearing or washer 105 is arranged between the sprocket and the adjacent side of the block 94 to prevent axial movement of the bushing 95 in the other direction. In accordance with the invention the rod 93 is rotated to effect the above described transverse advancement of the workpiece W. The means for rotating the rod 93 includes the sprocket 99 just mentioned and a second sprocket 8 secured to the shaft of a worm wheel 101. A chain 106 operates over the sprockets 99 and 8 to operatively connect the same. The wheel 101 is in turn driven by a worm 102 which is manually rotated by a forwardly extending shaft 103 provided with a hand crank 107 that is readily accessible at the front of the apparatus at or adjacent the operator's position.

The transverse feed means 29 further includes chains 108 operating over the above described sprockets 77 on the carriages 26 and also operating over sprockets 109 associated with the rod 93. The sprockets 109 are keyed to tubes or bushings 110 on the rod 93. As best illustrated in Figures 11 and 12, the bushings 110 have polygonal openings 111 slidably receiving the rod 93 and the bushings are provided with diametrical cuts or slots 112 which extend for some distance longitudinally from the inner ends of the bushings. These slots 112 render substantial portions of the bushings 110 compressible and flexible so the bushings may be clamped onto the rod 93. Cap screws 113 serve to clamp the split bushings 110 on the rod 93. The bushings 110 extend through and are rotatably carried in the tubular lower portions of hangers or brackets 114 which, in turn, are fixed to the outer plates 31 of the carriages 26. The hubs of the abovementioned sprockets 109 are at the outer sides of the brackets 114 while the split ends of the bushings 110 have bosses or heads at the inner sides of the brackets so that the bushings and brackets are held against relative longitudinal movement. Split nuts 115 are threaded on the bushings 110 to retain the sprockets 109 thereon and screws 116 clamp the nuts on the bushings. With the construction just described the bushings 110 and brackets 114 connect the carriages 26 with the feed rod 93 so that longitudinal movement of the rod causes longitudinal movement of the carriages 26 along the tracks 20 and the bushings 110, sprockets 77 and 109 and the chain 108 operatively connect the rod 93 with the transverse feed means 29 described above so that rotation of the rod produces simultaneous rotation of the sprockets 90 to move the workpiece W transversely.

The longitudinal spacing of the carriages 26 along the tracks 20 is of course dependent upon the length of the workpiece to be acted upon or riveted and the apparatus is such that the carriages may be readily adjusted to any required spacing to accommodate workpieces of different lengths. This is accomplished by loosening the cap screws 113 of one or both of the bushings 110 to allow the bushings and, therefore, their respective carriages 26 to be moved longitudinally relative to the feed bar 93. Following such adjustment of the carriages 26 to the required positions the cap screws 113 are tightened down to again secure the carriages to the feed rod 93.

The invention contemplates the transverse feeding of the opposite ends of the workpiece W either in a uniform manner or differentially so that the riveting machine may either drive parallel rows of rivets or divergent rows of rivets. The above described sprockets 77 and/or sprockets 109 may be readily removed and replaced by sprockets of different effective diameters to obtain the desired ratios between the companion sprockets 77 and 109. It will be seen that when this ratio between the sprockets 77 and 109 is the same at both of the carriages 26 a given rotation of the hand crank 107 will produce simultaneous and equal transverse movement of the two carriages. However, upon loosening a cap screw 116 and removing the related nut 115, the sprocket 109 thus freed may be detached from its bushing 110 and replaced by a sprocket 109 having a different effective diameter so that the ratio between the sprockets 77 and 109 at the two carriages 26 is different, whereby one carriage 26 is advanced a greater or lesser distance than the other when the transverse feed means 29 is operated. The nut 115 is of course reapplied to the bushing 110 and locked thereon by the screw 116 to retain the new sprocket 109 in place. It will be observed that by properly relating the effective diameters of the sprockets 77 and 109 either one of the carriages 26 may be advanced transversely a greater or lesser distance with a given rotation of the hand crank 107 to provide for the driving of either convergent or divergent longitudinal rows of rivets in the workpiece W.

I have found it desirable, especially when handling large curved or contoured workpieces, to provide the transverse feed assemblies or mechanisms of the two carriages 26 with means for positively holding the workpiece W against unwanted transverse shifting that might be caused by the vibration accompanying the riveting operations and for allowing accurate minor manual transverse adjustment or shifting of the workpiece to bring the flanges of the stiffeners S into proper alignment with the anvil 14 and other elements of the riveting machine. These means are preferably associated with the above described blocks 68 which have limited movement on the pins or bolts 71. Each block 68 has an opening 160 extending axially of the workpiece W and manually removable T pins 161 are adapted to be arranged through the openings. This is best illustrated in Figure 26. Spaced openings 162 are provided in the upper edge portions of the contour bars 27 and are preferably located to be in axial alignment with the flanges of the stiffeners S or more accurately with the rivets R to be driven at the stiffener flanges. This relationship is shown in Figure 4. The pins 161, which are pointed or tapered at their ends are adapted to be passed through the openings 160 in the blocks 68 and then through selected openings 162 in the contour bars 27. To effect the abovementioned accurate transverse adjustment of the workpiece W the blocks 68 are moved transversely after the pins 161 are engaged in the openings 160 and 162 as just described. This means for adjusting the blocks 68 comprise thumb screws 164 threaded through openings in the opposite sides of the carriage standards 53 to have their inner ends cooperate with the sides of the blocks 68. It will be seen that subsequent to the approximately correct lateral advancement of the workpiece W by actuation of the means 29, the pins 161 may be inserted in the openings 160 and 162 and the screws 164 may then be operated to accurately adjust the workpiece transversely. The pins 161 thereafter lock or positively hold the workpiece W against lateral shifting or movement until it is desired to drive the next or another row of rivets R, whereupon the pins 161 are removed and the transverse feed means 29 are operated as above described. The pins 161 engaging in the openings 160 and 162 are particularly useful in holding the workpiece W against unintentional lateral or transverse movement in situations where the shapes, sizes and positions of the workpiece W might otherwise cause such unwanted movement.

The longitudinal feed means of the invention is characterized by its versatility of action and its ease of control whereby the operator may readily condition the work handling means to advance the workpiece W any desired distance at each operation and then condition the feed means to advance the workpiece in this manner for any given or desired number of advancements. The axial feed means is power operated and manually controlled and acts through the above described rod 93 to move the workpiece W in either direction along the tracks 20. In the drawings I have illustrated two embodiments or types of longitudinal feed means of the invention and I will first proceed with the description of the feed mechanism specifically illustrated in Figures 7, 8, 9 and 10 of the drawings. This mechanism includes a case 120 secured in the central trestle 21 to be adjacent the riveting machine body 10. The rod 93 passes centrally through the case 120 and in addition to the rod supporting bushings 95 and 110 described above, the rod may be supported adjacent the case 10 and at other longitudinally spaced points by rollers 121 appropriately mounted on the trestles 21. In this connection it is to be understood that the feed rod 93 may extend the entire length of the series of trestles 21 or for any desired distance and the rod is preferably made up of sections so that its length may be altered as the conditions of use require. Figure 29 illustrates the manner in which the sections of the rod are connected. Each end of each rod section has a tongue 122 which is substantially one-half the width of the rod and the tongues of the adjacent sections are lapped one upon the other so that the sections constitute a continuous uninterrupted rod assembly. Dowel pins 123 and cap screws 124 connect and align the rod sections. It will be seen that with this construction the rod 93 may be lengthened or shortened as required.

The case 120 contains two parallel cylinders 125, the cylinders being positioned at opposite sides of the rod 93 to extend parallel with the rod. Pistons 126 operate in the cylinders 125 and have rods 127 extending therefrom. The cylinders 125 face in opposite directions so that the rod 127 extends in one direction from one cylinder while the other rod 127 extends in the opposite direction from its respective cylinder. This is clearly illustrated in Figure 7. Fluid pressure, such as air under pressure, is supplied to the outer ends of the cylinders 125 by pipes or lines 168 which are supplied and controlled in the manner to be subsequently described. Means are provided for returning the pistons 126 after actuation. In the particular case illustrated each cylinder 125 contains a spring 129 for returning or restoring its piston 126 after actuation, although other piston restoring means may be employed if desired. The outer ends of the piston rods 127 carry blocks 130 provided with tranverse openings 131, see Figure 9. Double links 132 are pivotally connected with the blocks 130 by pins or bolts 133 passing through said openings 131. The outer ends of the links 132 are pivoted in the case 120 at 134. The links 132 extend substantially horizontally to intersect the vertical plane occupied by the rod 93 and because the cylinders 125 extend in opposite directions the outer ends of the links 132 are pivoted at the opposite sides of the case 120. It will be seen that actuation of one piston 126 by fluid pressure pivots the related link 132 in one direction axially of the rod 93, that is to the right, while actuation of the other piston 126 moves its respective link 132 to the left.

The above described piston actuated links 132 serve to move the feed rod 93 either to the right or the left as the case may be through the medium of clutches. There is a clutch for each link 132 and as the two clutches are identical, I will proceed with the description of one of them, it being understood that this description is equally applicable to the other clutch. The rod moving clutch is illustrated in detail in Figures 8 and 10 and includes a body 135 provided with a polygonal opening 136 conforming with and slidably receiving the rod 93. A split or sectional ring 137 is held in a groove in the exterior of the body 135 by clamp screws 139 passing through ears 140 on the ring to rotatably support the body. The ring 137 has two diametrically opposite pins or studs 141 and companion studs 142 are provided on the adjacent double link 132. Short links 143, which are substantially aligned with the rod 93, are pivoted on the studs 141 and 142 to operatively connect the clutch body 135 with its related link 132. A pair of plates or rings 144 and 145 is secured to an end of the body 135 by spaced cap screws 146 and the rings have polygonal openings 147 corresponding to the opening 136 and slidably or freely receiving the rod 93. The ring 145 is provided with circumferentially spaced internal inclined surfaces or cam faces 148. Where the rod 93 is hexagonal in cross section there may be three equally spaced cam faces 148. The faces 148 are pitched or inclined with respect to the longitudinal axis of the feed rod 93 and the three faces have an equal pitch and are inclined in the same direction. As best illustrated in Figure 8 the surfaces 148 slope laterally outward and toward the respective link 132. Gripping elements 150 are provided to cooperate with the pitched surfaces 148 and the flat side surfaces of the polygonal rod 93. In the form of the invention illustrated the gripping elements 150 of the clutches are in the nature of rollers, although it is apparent that they may be of other configurations. Plungers 151 are slidable in axial openings in the clutch body 135 and have recessed or concave heads 152 for cooperating with the rollers 150. Coiled compression springs 452 urge the plungers 151 axially so that the rollers 150 are urged into effective cooperation with the pitched surfaces 148 and the surfaces of the rod 93. It will be seen that with the construction just described the action of the respective piston 126 moves the clutch body 135 and the rollers 150 wedged between the pitched surfaces 148 and the rod 93 transmit the movement to the rod 93 so that the carriages 26 and the workpiece W are moved axially.

The invention provides novel, effective means for stopping or limiting the stroke of the rod 93 with each actuation of each piston 126 which means are adjustable to vary the stroke as desired to give the rivets the required spacing along the workpiece W. There is an adjustable stop means associated with each piston and clutch assembly and each stop means is separately or individually adjustable so that the movement or strokes of the work W in the two axial directions may be different if desired. Each of these stop means includes a stud or bolt 153 secured to the end of the case 120 and a number of stop plates 154 pivoted or hinged on the stud. The outer ends of the stop plates 154 have hooks 156 (see Figure 9) for hooking over a pin 157 projecting from the end of the case 120. When the plates 154 are engaged on the pins 157 they are in position to be contacted by the block 130 on the end of the related piston rod 127 to form abutments or stops to limit the active fluid pressure actuated stroke of the respective piston 126 and accordingly limit the travel or stroke of the workpiece W. On the other hand, when a plate 154 is swung to the inactive position, indicated in broken lines in Figure 9, it is no longer in alignment with the block 130 so that the stroke of the mechanism is increased by an extent equal to the thickness of the stop plate. The thicknesses of the stop plates 154 are graduated in such a way that practically any step by step advancement of the workpiece W may be obtained and the stop plates may be easily removed from the pins or bolts 153 and replated by plates of selected thickness to obtain any given workpiece advancement.

As above described, the cylinder and piston mechanisms 125—126 are provided with springs 129 for restoring the pistons 126 when the fluid pressure is exhausted from the respective cylinders 125 at the end of each actuation. The springs 129 of course also restore the links 132 and the clutch mechanisms, the rollers 150 riding freely along the rod 93 during these return motions. Means are provided to insure the positive disengagement of the rollers 150 so that the rollers of one clutch cannot interfere with the advancement of the rod 93 and workpiece W by the action of the other clutch. This means includes cross or transverse members 158 secured in the case 120 to extend adjacent the ends of the cylinders 125. Release plungers or pins 159 are slidable in axial openings in the end rings 144 of the clutches and there is one pin 159 for each roller 150. The inner ends of the pins 159 are broadened and shaped to cooperate with the rollers 150 and the pins extend outwardly beyond the ring 144 to be engageable with the cross members 158. Upon actuation of one clutch mechanism by its respective piston 126 the other clutch mechanism may tend to move with the rod 93 but the pins 159 contact the respective or adjacent member 158 to be positively stopped thereby and the pins 159 in turn hold the rollers 150 released so that the rod 93 may freely move through that clutch mechanism.

Any appropriate system may be used to supply actuating fluid pressure to the cylinders 125 of the clutch mechanisms for effecting the axial or longitudinal feeding of the workpiece W although where the riveting machine is actuated by air under pressure it is usually desirable to also employ the same fluid pressure for the operation of the axial feed means. In Figures 1 and 3, I have shown a flexible hose or line 166 extending from the riveting machine to conduct air under pressure to manual valves 167 which control the delivery of actuating pressure to the cylinders 125. The valves 167 are operable to connect the pressure supply line 166 with the pipes or lines 168 leading to the cylinders 125, there being a valve for each line 168. The valves 167 may be foot or pedal operated or may be placed on the workpiece W for hand operation as illustrated. The valves 167 may be conventional poppet type valves that are normally spring held in positions where their respective cylinder lines 168 are open to the atmosphere and closed to the pressure supply line 166 and are manually operable to connect their respective lines 168 with the pressure supply line 166 to actuate their respective pistons 126. It will be seen how the valves 167 may be conveniently operated to selectively actuate the pistons 126 and thus cause the related clutch mechanism to feed the rod 93 and the workpiece W in the required axial direction for a distance determined by the stop plates 154.

It is desirable to instantly or quickly exhaust air pressure from the actuating cylinders 125 when their respective valves 167 are released to return to the normal closed condition. In Figure 7 I have shown valves 169 connected between the cylinders 125 and their related pressure lines 168 for effecting the rapid discharge of pressure from the cylinders. The valves 169 have passages 170 leading from the lines 168 to the cylinders 125 and have internal chambers 171 intersecting these passages. The outer ends of the chambers 171 have ports 172 communicating with the atmosphere. Movable flow directing or controlling members 173 operate in the chambers 171 between positions where they close off communication between the passages 170 and the ports 172 and positions where the inner parts of the passages 170 and the cylinders are in communication with the exhaust port 172. Springs 174 urge the members 173 to the last named positions while the air under pressure from the lines 167 moves the members to the positions where they close the exhaust ports 172. In practice, as soon as a valve 167 is closed or allowed to return to its normal position, the spring 174 in the related valve 167 moves the member 173 to the position where the pressure in the cylinder 125 may discharge through the port 172.

When the workpieces to be handled are of substantial length it may be desirable or necessary to provide the apparatus with one or more intermediate work supporting means. Figures 16 to 18 inclusive illustrate an intermediate work supporting means of the invention, it being understood that there may be two or more such devices or means employed. The work supporting means is such that it travels longitudinally with the workpiece W as the same is advanced by the longitudinal feed means and carries or assists in carrying the workpiece for free transverse feeding or movement. This means includes what I will term a false rib 176 associated with the workpiece W to move therewith. The rib 176 has notches 177 in its upper edge to receive the stiffeners S of the workpiece and has flanges 178 extending along its lower edge and projecting from its opposite sides. The lower edge of the rib 176 and its flanges 178 follow generally the transverse curvature of the workpiece W. The intermediate work supporting means further includes carriages or trucks 179 provided with spaced grooved rollers 180 for riding on the knife edges 23 of the tracks 20 and further provided with rollers 181 for cooperating with the lower surfaces 25 of the tracks. An arch or bridge 182 comprised of two spaced vertically disposed plates extends between and is secured to the trucks 179 by bolts or screws 183. This bridge 182 has its lower edge sloping upwardly and inwardly toward its center so as to clear the anvil 14 of the riveting machine when the anvil is lowered or retracted. Further, as best illustrated in Figure 17, the sides of the bridge 182 have centrally located notches 184 for partially receiving the anvil 14 so that riveting operations may be carried on in close proximity to the center line of the bridge 182. Blocks 185 are secured to the upper side of the bridge 182 adjacent the notches 184 by pin and slot connections 186 so as to have limited movement toward and away from the rib 182. Rollers 187 are rotatably carried by the blocks 185 and ride on or engage the upper surfaces of the rib flanges 178 at a zone substantially midway between the two tracks 20. Blocks 188 are secured in the bridge 182 and have notches or openings 189 freely receiving rollers 190. The shafts or trunnions 191 of the rollers 190 are rotatably supported in recesses 192 in the bridge 182 to cooperate with or support the rib 182 and thus assist in supporting the workpiece W at points adjacent and at opposite sides of the above described rollers 187. The lower rollers 190 are flanged to cooperate with the edges of the rib flanges 178 so that the bridge 182 and the associated parts move axially with the workpiece W.

The intermediate work supporting means further includes vertically adjustable rollers 193 for supporting the workpiece W at points or zones outboard of the tracks 20. The rollers 193 engage the lower edge of the rib 176 and are supported on the outer ends of bell cranks 194. The shafts or trunnions 295 of the rollers 193 are removably retained in notches in the bell cranks 194 by pivoted latches 195 so as to be replaceable by rollers of different diameters to adapt the work supporting means to handle workpieces of different contours. The bell cranks 194 are pivoted to the opposite ends of the bridge 182 at 196 and their lower arms are actuated by screw thread means to effect vertical adjustment of the rollers 193. These screw thread means include gimbal blocks 197 carried by horizontal shafts or trunnions 198 pivoted in the bridge 182. Shafts 199 are screw threaded through generally horizontal openings in the blocks 197 and project outwardly beyond the tracks 20. Hand wheels or knobs 200 are fixed to the inner and outer ends of the screw shafts 199 to facilitate their manual operation. The lower arms of the bell cranks 194 carry blocks 201 swiveled on pivot pins 202 and the screw shafts 199 pass through generally horizontal openings in the blocks. Collars 203 are fixed to the shafts 199 at the inner ends of the blocks 201 while the knobs 200 are at the outer ends of the blocks. Suitable thrust washers or bearings 204 are arranged between the opposite ends of the blocks 201 and the adjacent knobs 200 and collars 203 to allow free rotation of the screw shafts while transmitting axial movement from the shafts to the bell cranks 194 to pivot the latter. It will be seen that the knobs 200 may be manually turned to elevate or lower the rollers 193 to adapt the intermediate work supporting means to adequately support the curved or contoured workpiece W.

The alternate or optional form of clutch mechanism for incorporation in the axial feed means is illustrated in Figures 19 to 25 inclusive, where Figure 19 corresponds generally to Figure 8 and illustrates one of the clutch assemblies in detail. As in the previously described form of clutch mechanism, each clutch or rod gripping means includes a body 205 and a pair of rings 206 and 207 secured to an end of the body by cap screws 208. A polygonal opening 209 passes through the body 205 and the rings 206 and 207 to slidably or freely receive the axial feed rod 93. The ring 206 has pitched internal faces 210 and gripping elements such as rollers 211 are arranged in the ring to cooperate with the pitched faces and the flat surfaces of the polygonal rod 93, the faces 210 and rollers 211 being the same as the faces 148 and rollers 150 described above. The ring 207 carries axially movable plungers or pins 112 which are engageable with the cross members 158 of the case 120 to free or release the rollers 211 in the same way as the above described pins 158. Clutches of the type illustrated in Figures 19 and 20 are operatively connected with their respective pistons 126 in the same manner as the previously described clutch mechanisms, the short link 143 being pivotally connected with a ring 137 rotatably connected with the clutch body 205. The link 143 is also pivotally connected with the longer transverse links 132 while the latter links are pivotally connected with the related piston rods 127. In this form of the invention a sleeve 214 freely surrounds the feed rod 93 adjacent each clutch body 205 and the bodies carry slidable circumferentially spaced pins or plungers 215 which cooperate with the rollers 211 and the sleeves 214. The inner ends of the pins 215 are shaped to conform with the rollers 211 while the other portions of the pins 215 are reduced in diameter and extend from the ends of the bodies 205. Springs 216 cooperate with the plungers 215 to urge them against the rollers 211 and to urge the rollers axially of the inclined or pitched faces 210. The plungers 215 extend from the clutch bodies 205 to cooperate with the ends of the adjacent sleeves 214 and the sleeves in turn cooperate with adjustable stop means illustrated in detail in Figures 20 to 25 inclusive. I will proceed with a description of one of these adjustable stop assemblies or means, it being understood that this description is equally applicable to the stop means associated with the other clutch mechanism.

Each adjustable stop means includes a pair of studs 217 projecting from the adjacent end wall of the case 120 and located at opposite sides of the axial feed rod 93. A stop plate 218 has a polygonal opening 219 freely passing the feed rod 93 and is supported on the studs 217 for adjustment axially of the rod. The side of the plate 218 which faces the related and adjacent clutch mechanism is substantially normal to the rod 93 while the other side of the plate has an inclined track or way 220. A transversely adjustable shim or plate 221 is engaged between the way 220 and the adjacent end wall of the case 120. The adjusting plate 221 has an elongate opening 222 for receiving the feed rod 93 and one side of the plate flatly bears on the wall of the case 120 while the other side of the plate is inclined to slidably conform to the way 220. A rod 223 extends forwardly from the adjusting plate 221 and projects through the wall of the case 120 to facilitate manual adjustment of the plate 221. In practice, nuts 224 may be threaded on the rod 223 to cooperate with the wall of the case 20 to adjust the plate 221 and to lock the plate in its adjusted position. It will be seen how the adjusting plate 221 may be shifted transversely of the feed rod 93 to adjust the stop plate 218 axially of the feed rod.

One or more stops 225 are arranged on the axial feed rod 93 in front of the stop plate 218 to be engaged by the above described sleeve 214. In practice, a number of stops 225 of different or graduated thicknesses is provided with the apparatus whereby the axial stroke of the feed rod 93 and therefore of the workpiece W, may be regulated or adjusted at will. As best illustrated in Figure 25, the stops 225 are substantially U-shaped parts having downwardly facing notches 226 for receiving the rod 93. The stops 225 may be placed or arranged on the rod 93 and may be individually removed and replaced as conditions of use of the work-handling device require. By selecting stops 225 of required thicknesses and/or by adjusting the plate 221 the stop assembly may be given practically any effective thickness. It will be seen that upon actuation of a piston 126 the respective clutch body 205 is moved axially so that the rollers 211 wedge between the inclined faces 210 and the flat surfaces of the feed rod 93 to transmit the motion to the feed rod and the workpiece W, thus advancing the latter axially of the machine assembly. This motion continues until the outer ends of the plungers 215 engage the sleeve 214 and the latter engages the stops 225. When this occurs motion of the clutch assembly, the feed rod 93 and the workpiece W is positively stopped or terminated. The adjustable stop assembly described above prevents further movement of the rods or plungers 215 and the latter are engaged with the rollers 211 which, in turn, are wedged between the surfaces of the rod 93 and the faces 210 to insure the immediate stopping of the workpiece W. The form of clutch mechanism and stop assembly illustrated in Figures 19 to 25 inclusive, is particularly advantageous when the equipment is intended to handle large or heavy workpieces as it prevents the inertia of the heavy workpieces from causing overtravel at the ends of the axial feed advancements.

From the foregoing detailed description it will be apparent that I have provided a practical, effective, work handling apparatus useful in connection with machines for forming openings, inserting rivets and driving rivets in workpieces of various shapes, contours and sizes. The functions and operation of the several instrumentalities of the work handling apparatus have been described above in connection with the descriptions of their constructions and it is believed unnecessary to again describe in detail the operation of the several mechanisms. However, the general mode of operation of the device will be set forth. Preparatory to arranging a given workpiece W on the apparatus, contour bars 27 are constructed to have upper and lower edges which conform generally with the transverse contour of the workpiece and to have the transverse feed pins 89 and the aligning openings 162, the latter being located in accordance with the positions of the rows of rivets to be driven in the workpiece. The bars 27 are secured to the ends of the workpiece and the assembly is arranged in place on the device to be supported at its ends by the sprockets 90 and the rollers 50 and to be supported intermediate its ends by the rollers 192 and 193. The rollers 50 are adjusted vertically by operation of the cranks 65 and/or the knobs 60 to properly support the workpiece and the knobs 200 are operated to adjust the rollers 193 into supporting cooperation with the false rib 176 which is associated with the workpiece. The rollers 72 and the rollers 187 are installed or arranged in place to cooperate with the contour bars 27 and the rib flanges 178 respectively to assist in preventing displacement of the workpiece. With the workpiece properly supported on the apparatus it may be moved transversely by operation of either the crank 107 or the cranks 92 and accurate transverse adjustment of the workpiece may be effected by manipulation of thumb screws 164 and, if necessary, by loosening the clamp nuts 88 and turning the shafts 78 as required. In this connection it is to be understood that the ends of the workpiece W may be moved transversely equal distances at each transverse advancement to provide for the driving of parallel rows of rivets or they may be moved unequal distances to provide for the driving of divergent or convergent rows of rivets as previously described. When the ends of the workpiece W have been located as desired for the driving of a given set or row of rivets, they may be positively locked in place by inserting the pins 161 in the openings 162. To effect the axial advancement of the workpiece W the valves 167 are actuated to actuate the pistons 126 and their respective clutch mechanisms. As has been previously described, the actuation of a piston 126 moves or operates the related clutch mechanism so that the feed rod 93 and the workpiece W are advanced axially and the extent or length of the axial advancement is determined either by the number and thickness of the stop plates 154 or by the position of the adjusting plate 221 and the number and aggregate thickness of the stops 225. By adjusting the stop means associated with the clutch mechanisms the axial spacing of the rivets to be driven in the workpiece W may be controlled or varied as desired. It will be observed that the workpiece W may be intermittently advanced axially in either direction and the spacing of the rivets R may be varied as selected during such operations. The device is simple and easy to control and operate and does not require any appreciable manual effort on the part of the operator. The various feed means and adjustments of the apparatus are such that the workpiece W may be oriented or positioned with great accuracy for any given rivet driving operation and the device is adapted to handle both large and small workpieces such as panels and assemblies of various shapes and configurations.

Having described only typical forms of the invention I do not wish to be limited to the specific details herein set forth, but wish to reserve to myself any variations or modifications that may appear to those skilled in the art and fall within the scope of the following claims.

I claim:

1. A work supporting and advancing device comprising spaced tracks, carriages spaced longitudinally of the tracks and movable therealong, means on the carriages for supporting the work, means for advancing the carriages axially along the tracks including an axially movable and turnable member extending axially of the tracks, means for connecting the member with the carriages to be axially movable therewith and to be rotatable with respect to the carriages, and means for moving the member axially to advance the carriages, and means at the carriages operated by rotation of the member for advancing the work transversely in either direction.

2. A work supporting and advancing device comprising longitudinal tracks, carriages movable along the tracks, means on the carriages for supporting the ends of the work and operable to advance the same transversely of the tracks in either direction, and means for advancing the work longitudinally of the tracks comprising an elongate member extending parallel with the tracks and connected with the carriages to move therewith, a cylinder and piston mechanism, and a clutch operable by said mechanism to grip said member and to transmit motion from said mechanism to the member.

3. A work supporting and advancing device comprising longitudinal tracks, carriage means movable along the tracks, means on the carriage means for supporting the ends of the work and operable to advance the same transversely of the tracks, and means for advancing the work longitudinally of the tracks comprising a member connected with the carriage means to move therewith, a cylinder and piston mechanism, a clutch operable by said mechanism to grip said member and to transmit motion from said mechanism to the member and carriage means, and adjustable stop means engageable by the clutch for limiting the stroke of said member and carriages.

4. A work supporting and advancing device comprising longitudinal tracks, carriages movable along the tracks, means on the carriages for supporting the ends of the work and operable to advance the same transversely of the tracks in either direction, and means for advancing the work longitudinally of the tracks comprising a member connected with the carriages to move therewith, oppositely acting cylinder and piston mechanisms, a one-way clutch associated with each of said mechanisms for transmitting motion therefrom to said members, stop means engageable by each clutch to limit the motion of carriages, and means for controlling said mechanisms.

5. A work supporting and advancing device comprising longitudinal tracks, carriages movable along the tracks, means on the carriages for supporting the ends of the work and operable to advance the same transversely of the tracks in either direction, and means for advancing the work longitudinally of the tracks comprising a member connected with the carriages to move therewith, oppositely acting cylinder and piston mechanisms, a clutch associated with each of said mechanisms to be moved thereby and to transmit motion therefrom to said member, adjustable stop means for each clutch for limiting the stroke of the clutch and carriages, and means for controlling said mechanisms.

6. A work supporting and advancing device comprising longitudinal tracks, carriages movable along the tracks, means on the carriages for supporting the ends of the work and operable to advance the same transversely of the tracks, and means for advancing the work longitudinally of the tracks comprising a rotatable and longitudinally movable rod connected with the carriages to move the same along the tracks and rotatable with respect to the carriages, a cylinder and piston mechanism, one-way clutch means actuated by said mechanism to grip the rod and move the same longitudinally in one direction, stop means engageable by the clutch means to limit movement of the rod and carriages in said direction, manual means for controlling said mechanism to move the rod and carriages in said direction, means for rotating the rod, and an operative connection between the rod and the first named means whereby rotation of the rod advances the work transversely.

7. A device for supporting and advancing a workpiece having a transverse curved contour comprising curved bars secured to the ends of the workpiece and having the general contour thereof, longitudinal tracks, carriages movable on the tracks, means on the carriages cooperating with the bars to support the workpiece and operable to move the same transversely in either direction, said means including sprockets on the carriages supporting the bars, pins on the bars engaged by the sprockets for the transverse movement of the workpiece, and means for rotating the sprockets.

8. A device for supporting and advancing a workpiece having a transverse curved contour comprising curved bars secured to the ends of the workpiece and having the general contour thereof, longitudinal tracks, carriages movable on the tracks, means on the carriages cooperating with the bars to support the workpiece and operable to move the same transversely in either direction, said means including sprockets on the carriages supporting the bars, pins on the bars engaged by the sprockets for the transverse movement of the workpiece, means for rotating the sprockets, and means on the carriages for leveling and tipping the workpiece including vertically movable rollers for engaging the bars at the opposite sides of the sprockets, and manually operable means for moving the rollers vertically.

9. A device for supporting and advancing a workpiece having a transverse curved contour comprising curved bars secured to the ends of the workpiece and having the general contour thereof, longitudinal tracks, carriages movable on the tracks, means on the carriages cooperating with the bars to support the workpiece and operable to move the same transversely, said means including sprockets on the carriages cooperating with the bars to support the workpiece, pins on the bars engaged by the sprockets for the transverse movement of the workpiece, means for rotating the sprockets, means on the carriages for leveling and tipping the workpiece including vertically movable rollers for engaging the bars at opposite sides of the sprockets, and manually operable means for raising one roller while lowering the other.

10. A device for supporting and advancing a workpiece having a transverse curved contour comprising curved bars secured to the ends of the workpiece and having the general contour thereof, longitudinal tracks, carriages movable on the tracks, means on the carriages cooperating with the bars to support the workpiece and operable to move the same and the workpiece transversely, said means including sprockets on the carriages supporting the bars, pins on the bars engaged by the sprockets for the transverse movement of the workpiece, means for rotating the sprockets, means on the carriages for leveling and tipping the workpiece including vertically movable rollers for engaging the bars at opposite sides of the sprockets, and manually operable means for simultaneously raising and lowering the rollers.

11. A device for supporting and advancing a workpiece having a transverse contour comprising bars secured to the ends of the workpiece and having the general contour thereof, longitudinal tracks, carriages movable on the tracks, means on the carriages cooperating with the bars to support the workpiece and operable to move the same transversely, said means including sprockets on the carriages supporting the bars, pins on the bars engaged by the sprockets for the transverse movement of the workpiece, means for rotating the sprockets, means on the carriages for leveling and tipping the workpiece including vertically movable rollers for engaging the bars at opposite sides of the sprockets, and manually operable means for simultaneously raising and lowering said rollers and operable to raise one roller while lowering the other.

12. A device for supporting and advancing a workpiece having a transverse curved contour comprising curved bars secured to the ends of the workpiece and having the general contour thereof, longitudinal tracks, carriages movable on the tracks, means on the carriages cooperating with the bars to support the workpiece and operable to move the same and the workpiece transversely in either direction, said means including sprockets on the carriages supporting the bars, pins on the bars engaged by the sprockets for the transverse movement of the workpiece, means for rotating the sprockets, said bars having openings spaced therealong and means for retaining the ends of the workpiece in selected transverse positions comprising pins on the carriages engageable in said openings.

13. A device for supporting and advancing a workpiece having a transverse contour comprising bars secured to the ends of the workpiece and having the general contour thereof, longitudinal tracks, carriages movable on the tracks, means on the carriages cooperating with the bars to support the workpiece and operable to move the same transversely, said means including sprockets on the carriages supporting the bars, pins on the bars engaged by the sprockets for the transverse movement of the workpiece, and means for rotating the sprockets, said bars having openings spaced therealong, and means for effecting minor accurate transverse adjustment of the workpiece comprising movable blocks on the carriages, pins on the blocks adapted to be engaged in selected openings, and screw thread means for shifting the blocks.

14. A device for supporting and moving a workpiece comprising tracks, carriages movable longitudinally along the tracks, bars secured to the ends of the workpiece, rotatable sprockets on the carriages cooperating with the bars to support the ends of the workpiece and rotatable to move the workpiece transversely, a rotatable and longitudinally movable member extending parallel with the tracks, means for connecting the member with the carriages to move longitudinally therewith and to be rotatable relative thereto, means for advancing the workpiece longitudinally by stages including a cylinder and piston mechanism, a clutch operated by said mechanism to grip said member and move the member and carriages longitudinally, and means for controlling said mechanism, and means for moving the workpiece transversely in both directions including means for rotating the member, and drives for transmitting rotation from the member to said sprockets.

15. A device for supporting and moving a workpiece comprising tracks, carriages movable longitudinally along the tracks, bars secured to the ends of the workpiece, rotatable sprockets on the carriages cooperating with the bars to support the ends of the workpiece and rotatable to move the workpiece transversely, a rotatable and longitudinal member extending parallel with the tracks, means for connecting the member with the carriages to move longitudinally therewith and to be rotatable relative thereto, means for advancing the workpiece longitudinally by stages including a cylinder and piston mechanism, a clutch operated by said mechanism to grip said member and move the same and the carriages longitudinally, regulable stop means limiting the stroke of said mechanism and therefore the motion of said member and carriages, and means for controlling said mechanism, and means for moving the workpiece transversely in either direction including means for rotating the member, and drives for transmitting rotation from the member to said sprockets.

16. A device for supporting and moving a workpiece comprising tracks, carriages movable longitudinally along the tracks, bars secured to the ends of the workpiece, rotatable sprockets on the carriages cooperating with the bars to support the ends of the workpiece and rotatable to move the workpiece transversely, a rotatable and longitudinal member extending parallel with the tracks, means connecting the member with the carriages to move the same longitudinally and to be rotatable with respect thereto, means for advancing the workpiece longitudinally by stages including a cylinder and piston mechanism, a clutch operated by said mechanism to grip said member and move the same and the carriages longitudinally, and means for controlling said mechanism, and means for moving the workpiece transversely in either direction including means for rotating the member, and drives for transmitting rotation from the member to said sprockets, each of said drives including a releasable connection whereby said sprockets may be individually operated.

17. In a work supporting and moving device the combination of; tracks, carriage means movable along the tracks, means on the carriage means for supporting the work, a member movable axially of the tracks and connected with the carriage means, a cylinder and piston mechanism, a body around the member and having internal pitched faces, an operative connection between said mechanism and body whereby the mechanism moves the body, elements engaged between said faces and the surface of the member operable to transmit movement from the body to the member in one direction, stop means for limiting movement of the body and member in said direction, and means actuated by the stop means for forcing the elements more tightly between said faces and the surface of the member to prevent overtravel of the carriage means upon stopping of the member.

18. In a work supporting and moving device, the combination of; tracks, spaced carriages movable along the tracks, means on the carriages for supporting the work, a member movable axially of the tracks and connected with the carriages, a cylinder and piston mechanism, a body around the member and having internal pitched faces, an operative connection between said mechanism and body whereby the mechanism moves the body, elements engaged between said faces and the surface of the member operable to transmit movement from the body to the member in one direction, and stop means for limiting movement of the body and member in said direction, the stop means including a plurality of stops of different thicknesses movable from inactive positions to positions where they stop motion of the piston.

19. In a work supporting and moving devices the combination of; tracks, spaced carriages movable along the tracks, means on the carriages for supporting the work, a member movable axially of the tracks and connected with the carriages, a cylinder and piston mechanism, a body around the member and having internal pitched faces, an operative connection between said mechanism and body whereby the mechanism moves the body, elements engaged between said faces and the surface of the member operable to transmit movment from the body to the member in one direction upon movement of the piston in one direction, stop means, pins cooperating with the elements and engageable with the stop means to limit movement of the member and carriages in said direction and means for freeing said elements upon movement of the piston in the other direction.

20. In a work supporting and moving device the combination of; tracks, spaced carriages movable along the tracks, means on the carriages for supporting the work, a member movable axially of the tracks and connected with the carriages, a cylinder and piston mechanism, a body around the member and having internal pitched faces, an operative connection between said mechanism and body whereby the mechanism moves the body, elements engaged between said faces and the surface of the member operable to transmit movement from the body to the member in one direction, and stop means for limiting movement of the body and member in said direction, including pins engaging said elements and a stop assembly engaged by the pins to terminate movement of the elements and said member.

21. In a work supporting and moving device the combination of; tracks, means on the carriages for supporting the work, a member movable axially of the tracks and connected with the carriages, a cylinder and piston mechanism, a body around the member and having internal pitched faces, an operative connection between said mechanism and body whereby the mechanism moves the body, elements engaged between said faces and the surface of the member operable to transmit movement from the body to the member in one direction, and stop means for limiting movement of the body and member in said direction, including pins engaging said elements and a stop assembly engaged by the pins to terminate movement of the elements and said member including a manually shiftable wedge stop plate.

22. In a work supporting and moving device the combination of; tracks, spaced carriages movable along the tracks, means on the carriages for supporting the work, a member movable axially of the tracks and connected with the carriages, a cylinder and piston mechanism, a body around the member and having internal pitched faces, an operative connection between said mechanism and body whereby the mechanism moves the body, elements engaged between said faces and the surface of the member operable to transmit movement from the body to the member in one direction, and stop means for limiting movement of the body and member in said direction including pins engaging said elements and a stop assembly engaged by the pins to terminate movement of the elements and said member comprising a plurality of removable and replaceable stops of varying size.

GORDON P. ROTHWELL.

References Cited in the file of this patent

UNITED STATES PATENTS

| Number | Name | Date |
|---|---|---|
| 512,829 | Hunter | Jan. 16, 1894 |
| 898,431 | Brightman | Sept. 15, 1908 |
| 977,344 | Thompson | Nov. 29, 1910 |
| 2,216,403 | Oeckl et al. | Oct. 1, 1940 |
| 2,479,623 | Johnson | Aug. 23, 1949 |
| 2,516,428 | Scott | July 25, 1950 |